F. SCHLEY.
Insertable Saw-Teeth.
No. 209,627.    Patented Nov. 5, 1878.
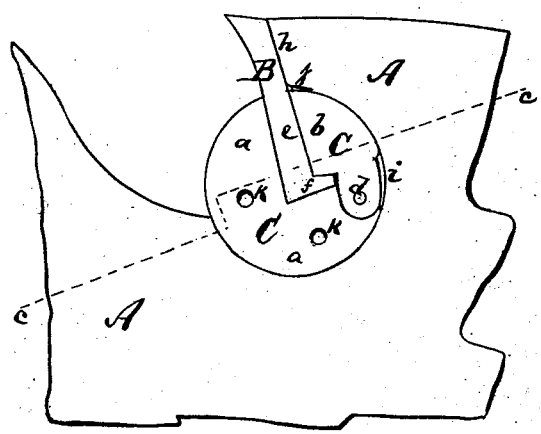
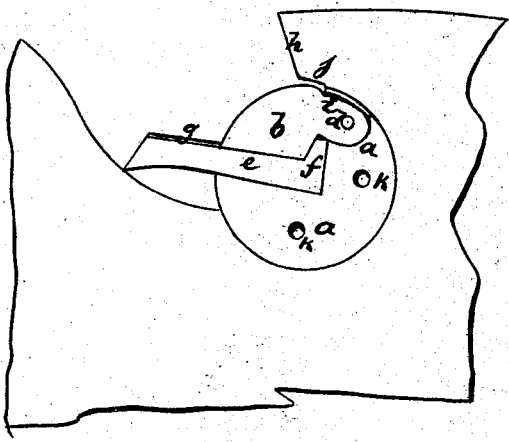
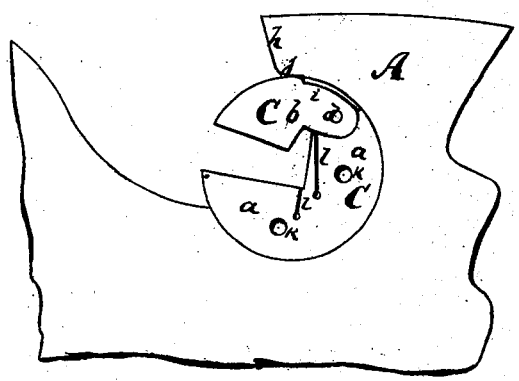
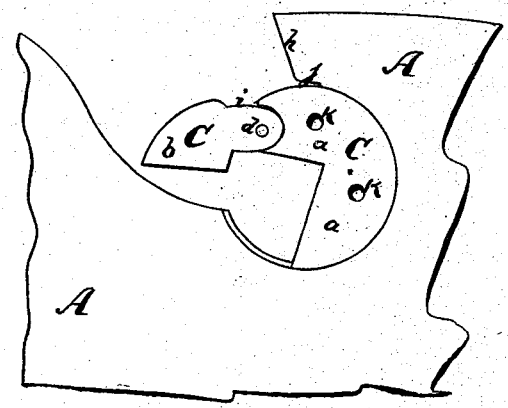
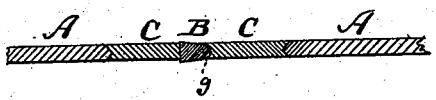
Witnesses:
John C. Tunbridge
D. v. Briesen
Inventor:
Frederick Schley
by his attorney
A. v. Briesen

UNITED STATES PATENT OFFICE.

FREDERICK SCHLEY, OF NEW YORK, N. Y.

IMPROVEMENT IN INSERTIBLE SAW-TEETH.

Specification forming part of Letters Patent No. 209,627, dated November 5, 1878; application filed October 5, 1878.

*To all whom it may concern:*

Be it known that I, FREDERICK SCHLEY, of New York city, county and State of New York, have invented a new and Improved Saw-Tooth for Circular Saws, of which the following is a specification:

Figures 1, 2, 3, and 4 are face views of a portion of a circular-saw blade provided with my improved saw-tooth, showing the same and its carrier in different positions. Fig. 5 is a cross-section on the line $c\ c$, Fig. 1.

Similar letters of reference indicate corresponding parts in all the figures.

This invention relates to a new form of detachable saw-tooth, and to a new manner of securing the same within the saw-blade.

The invention consists in combining the saw-tooth with a jointed circular carrier; also, in making the saw-tooth L-shaped, and in the new construction of carrier, all as hereinafter more fully described.

In the drawing, the letter A represents part of the blade of a circular saw. B is the insertible tooth; C, its carrier. The carrier is of circular form, and is inserted within a circular cavity of the saw-blade, which embraces about two hundred and fifty-five degrees of the circumference of the carrier, as shown in Fig. 1. The periphery of the carrier C is grooved, and the corresponding edge of the saw V-shaped to fit said groove, or vice versa, as indicated in Fig. 5. The carrier is jointed, being composed of two parts, $a$ and $b$, that are hinged together at $d$. Between these parts the shank $e$ of the tooth B is confined, said shank being L-shaped, having a projecting foot, $f$, as shown, for the reception of which the requisite recess is left between the jointed pieces $a$ and $b$ of the carrier.

The back edge of the tooth B is convex or V-shaped, and enters a corresponding groove in the part $b$ of the carrier, as indicated in Fig. 5; also, a corresponding groove in that part $h$ of the saw-blade against which the tooth bears, as indicated in Fig. 1. These several V-shaped projections, hereinabove referred to, serve to prevent lateral displacement of the parts A, B, and C.

Near its pivoted end the part $b$ of the carrier has a notch or recess, $i$, at its outer edge. The same is clearly shown in Fig. 1. The upper outer end of the circular cavity in the saw-blade has also a recess, $j$. (Clearly shown in Fig. 1.)

When the parts are in position, as in Fig. 1, the tooth B bears against the edge $h$ of the saw-blade, and is thus properly braced for operation, the foot $f$ preventing it from being thrown out by centrifugal force.

In order to remove or replace the tooth, the carrier must be turned within its containing-cavity, so as to bring the recesses $i$ and $j$ opposite each other, as in Fig. 2. This gives room to swing the part $b$ up far enough (see Fig. 3) to release the tooth. It is evident that instead of having both recesses $i$ and $j$, but one such recess may be used; but if only one is used, it will have to be made deeper than if two are used.

If after the removal of the tooth it is desired to also remove the carrier C, it is only necessary to still further turn the latter until no more than one hundred and eighty degrees of the circumference of the piece $a$ are in contact with the edge of the embracing-cavity, as shown in Fig. 4. In order to bring the parts into this position, the part $b$ must be swung far open, as shown in Fig. 4. In this position it is easy to remove the carrier C from the blade. The replacement of the parts takes place in the inverse order of their removal, and with equal facility.

The carrier can be turned by means of a suitable wrench having two pins or a single prismatic projection.

The carrier has a hole or holes, $k\ k$, for the reception of the wrench-gripe. If it be desired to render the carrier elastic, it may be slit, as indicated at $l\ l$ in Fig. 3.

I claim—

1. The circular carrier C, composed of the parts $a$ and $b$, that are hinged together for combination with a detachable saw-tooth, which is clamped between said parts $a$ and $b$, substantially as herein shown and described.

2. The circular jointed carrier C, composed of the parts $a$ and $b$, which are pivoted together, and constructed with recess $i$ in the outer part of the link $b$, for operation substantially as herein shown and described.

3. The combination of the saw-tooth B, having foot $f$, with the circular carrier C, which is composed of the parts $a$ and $b$, recessed to receive the tooth and its foot between them, substantially as herein shown and described.

FREDERICK SCHLEY.

Witnesses:
T. B. MOSHER,
F. V. BRIESEN.